United States Patent [19]

Macon, Jr. et al.

[11] Patent Number: 5,600,817

[45] Date of Patent: *Feb. 4, 1997

[54] ASYNCHRONOUS READ-AHEAD DISK CACHING USING MULTIPLE DISK I/O PROCESSES ADN DYNAMICALLY VARIABLE PREFETCH LENGTH

[75] Inventors: James F. Macon, Jr., Boynton Beach, Fla.; Shauchi Ong, San Jose, Calif.; Feng-Hsien W. Shih, Hsien-Chu, Taiwan

[73] Assignee: International Business Machines Corporation, Armonk, N.Y.

[*] Notice: The term of this patent shall not extend beyond the expiration date of Pat. No. 5,410,653.

[21] Appl. No.: 371,107

[22] Filed: Jan. 11, 1995

Related U.S. Application Data

[63] Continuation of Ser. No. 899,565, Jun. 16, 1992, Pat. No. 5,410,653.

[51] Int. Cl.⁶ .................................................. G06F 12/08
[52] U.S. Cl. .......................... 395/464; 395/250; 395/440; 395/463; 364/DIG. 1
[58] Field of Search .................................. 395/250, 445, 395/460, 464, 481, 486, 440, 463

[56] References Cited

U.S. PATENT DOCUMENTS

| | | | |
|---|---|---|---|
| 3,898,624 | 8/1975 | Tobias | 395/250 |
| 4,371,927 | 2/1983 | Wilhite et al. | 395/250 |
| 4,437,155 | 3/1984 | Sawyer et al. | 395/463 |
| 4,489,378 | 12/1984 | Dixon et al. | 395/853 |
| 4,490,782 | 12/1984 | Dixon et al. | 395/463 |
| 4,792,917 | 12/1988 | Takamatsu et al. | 395/841 |
| 4,800,483 | 1/1989 | Yamamoto et al. | 395/306 |
| 4,819,203 | 4/1989 | Shiroyanagi et al. | 395/440 |
| 4,860,192 | 8/1989 | Sachs et al. | 395/403 |
| 4,882,642 | 11/1989 | Taylor et al. | 360/78.11 |
| 4,947,319 | 8/1990 | Bozman | 395/700 |
| 4,972,364 | 11/1990 | Barrett et al. | 395/444 |
| 4,980,823 | 12/1990 | Liu | 395/463 |
| 5,043,885 | 8/1991 | Robinson | 395/460 |
| 5,134,563 | 7/1992 | Taylor et al. | 395/250 |
| 5,146,578 | 9/1992 | Zangenehpour | 395/464 |
| 5,150,472 | 9/1992 | Blank et al. | 395/464 |
| 5,226,141 | 7/1993 | Esbensen | 395/497.02 |
| 5,257,370 | 10/1993 | Letwin | 395/650 |
| 5,276,840 | 1/1994 | Yu | 395/855 |

OTHER PUBLICATIONS

A. J. Smith, "Cache Memories", Computer Surveys, vol. 14, No. 3, Sep. 1982, pp. 482–484.
IBM TDB vol. 26, No. 7A, Dec. 1983, Multiprocessor Control of Cached Peripheral Systems.
"Cache Operations by MRU Change", Kimming So et al., IEEE, vol. 37, No. 6, Jun. 1988 pp. 700–709.

*Primary Examiner*—Parshotam S. Lall
*Assistant Examiner*—Viet Vu
*Attorney, Agent, or Firm*—Perman & Green

[57] ABSTRACT

A file-based Read-ahead method employs asynchronous I/O processes to fetch Demand and Read-ahead data blocks from a disk (4), depending on their physical and logical sequentialities. When a file system (10) issues an I/O address to obtain data blocks from a file, it also determines the disk location of data blocks that are logically consecutive with the demanded data. The number of such data blocks to be determined in this process is accomplished in accordance with a dynamic Read-ahead method. If the data blocks are physically consecutive, a single I/O request is sent to a disk driver to obtain both the Demand data block and to Prefetch the Read-Ahead data block(s). If, instead, the data blocks are found not to be physically consecutive, a plurality of asynchronous disk I/O requests are issued so as to separately obtain the Demand and the Read-Ahead data blocks.

14 Claims, 4 Drawing Sheets

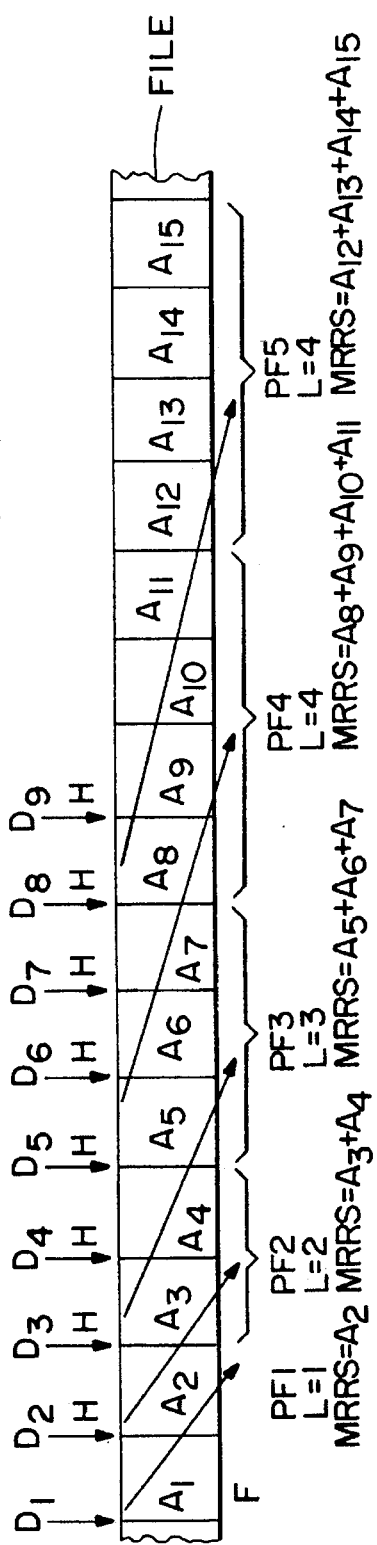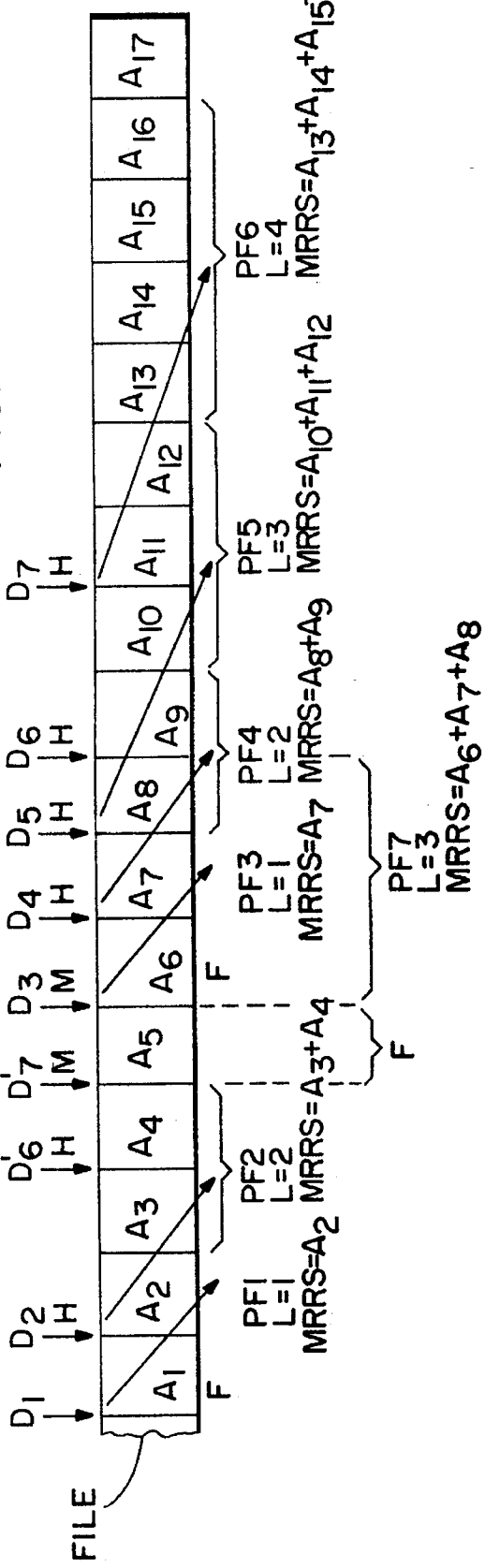

ASYNCHRONOUS READ-AHEAD DISK CACHING USING MULTIPLE DISK I/O PROCESSES ADN DYNAMICALLY VARIABLE PREFETCH LENGTH

This is a continuation of application Ser. No. 07/899,565 filed on Jun. 16, 1992, now U.S. Pat. No. 5,410,653.

FIELD OF THE INVENTION

This invention relates generally to data processing systems that employ a data cache wherein both demand and prefetched data are stored and, in particular, to improved methods for prefetching units of data from a mass storage device, such as a rotating disk.

BACKGROUND OF THE INVENTION

Disk caching is a known disk access avoidance technique that maintains a set of data blocks in a high speed disk cache memory, with the expectation that some or all of these data blocks will subsequently be requested (demanded) by a data processor. In addition to demanded data blocks that are cached during each disk access, a read-ahead disk cache determines a number of additional blocks to be fetched into the disk cache, and thus eliminates the need of some future disk access to the data. In that a disk access, also known as an Input/Output (I/O) Process, is typically one or more orders of magnitude slower than an access to the semiconductor memory that comprises the disk cache, it can be appreciated that the maintenance of prefetched data units in the disk cache yields significant improvements in processing efficiency.

The number of data units to be prefetched, that is, the prefetch length (L), may be assigned statically or may be dynamically adjusted in some fashion based on disk access patterns. However, the conventional read-ahead disk cache only accesses, using a single I/O Process, data blocks or units, for example sectors, that are physically consecutive to the demanded data blocks. Since a sequentially accessed file may not have physical sequentiality on the disk, i.e. the data may not reside in consecutive data blocks, the performance advantage of the read-ahead disk cache is reduced. Furthermore, in known types of conventional disk cache designs, a read-ahead is issued only when the demanded data is not located within the disk cache, i.e., during disk cache misses. No file access process is issued for a disk cache hit condition.

FIG. 2a illustrates the logical organization of a plurality of sequential data blocks (B) on a mass storage device, typically a disk. By example, each data block may represent a sector or a track of the disk. The group of data blocks are associated with a file. By example only, the file may contain employee records for an organization. In response to a Demand for a Block ($B_i$), the Block $B_i$ is Fetched, and the blocks $B_{i+1}$ to $B_{i+3}$ are Prefetched. FIG. 2b illustrates a physical, as opposed to a logical, organization of the data Blocks. As can be seen, the Blocks associated with the file may not be physically contiguous to one another, but may instead be separated by some number of Blocks (designated with an X) that are associated with another file, or that are defective and, hence, unused. The conventional disk cache mechanism performs one I/O Process to access the Demand Block $B_i$ and also the Prefetched Blocks $b_{i+1}$ to $b_{i+3}$. Because of disk latencies and/or other disk access characteristics, a significant amount of time may elapse between the access to Blocks ($B_i$ and $B_{i+1}$) and the Blocks ($B_{i+2}$ and $B_{i+3}$). As a result, the Demanded Block ($B_i$) may not be returned to the requester for a significant period of time, thereby reducing the efficiency of the disk cache.

It is thus one object of this invention to provide a method to improve the efficiency of a data cache, particularly a disk cache.

It is another object of this invention to provide a disk cache having a prefetch mechanism that is optimized for efficiently responding to sequential Demands for data units.

SUMMARY OF THE INVENTION

The foregoing and other problems are overcome and the objects of the invention are realized by a file-based Read-ahead method that employs asynchronous I/O processes to fetch Demand and Read-ahead data blocks depending on their physical and logical sequentialities. When a file system issues an I/O address to obtain data blocks from a file, it also determines locations in a mass store device of data blocks that are logically consecutive with the demanded data. The number of such data blocks to be determined in this process is accomplished in accordance with a dynamic Read-ahead method. If the data blocks are physically consecutive, a single I/O request is sent to the device driver to obtain both the Demand and to Prefetch the Read-Ahead data block(s). If, instead, the data blocks are found not to be physically consecutive, a plurality of asynchronous disk I/O requests are issued so as to separately obtain the Demand and the Read-Ahead data block(s).

In order to perform an intelligent Read-ahead operation, a dynamic adjustment of the Read-ahead Prefetch Length (L) between predetermined upper and lower limits is implemented. A Read-ahead disk cache section is defined that contains data block addresses obtained from a most recent Read-ahead process to each file. This defined disk cache section is referred to a Most Recent Read-ahead Section (MRRS). During the data processing of a file, if a subsequent Demand hits the MRRS, the Read-ahead Length (L) is increased by one for a next access to that file. For a Demand that results in a disk cache miss, the value of L for that file is reduced by one. No change is made to L when a Demand file request hits a disk cache location other than the MRRS. Presently preferred upper and lower limits for L are four ($L_{MAX}$) and one ($L_{MIN}$), respectively. For $L_{MAX}$, up to four data unit (pages) on the disk are checked for file location for a Read-ahead Prefetch, and only those pages that are physically consecutive or contiguous are accessed in one Read-ahead I/O Process, with the non-contiguous page(s) being accessed in a separate Read-ahead I/O Process.

The teaching of the invention also provides for the issuance of a Read-ahead I/O Process when a Demand file request hits the MRRS for the first time, and thus anticipates a sequential data access to the file. This approach provides an initiative, active, and constant Read-ahead for sequentially accessed files. However, if the Demand request to a file arrives before the completion of the last Read-ahead I/O process, no additional Read-ahead I/O process is issued. As a result, Prefetch operations are not enqueued and there is, at most, one Read-ahead I/O Process at any given time.

The teaching of the invention thus provides efficiency improvements for a disk cache. Furthermore, the teaching of the invention provides Prefetch optimizations for purely sequential disk accesses.

In accordance with a first process of the invention there is provided a method for operating a data cache that is coupled to a data store. The method includes the steps of (a)

receiving a Demand for a unit of data from a requestor; (b) determining from one or more data cache entries if the Demanded unit of data is resident in a data cache; and (c) if the Demanded unit of data is determined to be resident in the data cache, returning the Demanded unit of data from the data cache to the requestor. In accordance with an aspect of the invention, the step of determining includes the steps of, (d) determining from a predetermined one of the data cache entries if the Demanded unit of data is a unit of data that was most recently prefetched into the data cache from the data store, and, if so, (e) prefetching up to L further units of data from the data store to the data cache. The step of prefetching prefetches up to L further units of data that are logically contiguous to a last prefetched unit of data, and includes a step of updating the predetermined one of the data cache entries to indicate the identities of the L prefetched units of data. The value of L is dynamically variable so as to optimize the prefetching of logically contiguous units of data.

In accordance with a further process of the invention there is provided a method for operating a data cache that is coupled to a mass storage device. This method includes the steps of (a) receiving a Demand for a unit of data from a requestor; (b) determining from one or more data cache entries if the Demanded unit of data is resident in a data cache; and if the Demanded unit of data is determined not be resident in the data cache, (c) accessing the mass storage device to retrieve the Demanded unit of data and one or more additional, logically contiguous units of data. If the one or more additional units of data are physically contiguous to one another and to the Demanded unit of data, within the mass storage device, the step of accessing is accomplished with one I/O Process. However, if the one or more additional units of data are not physically contiguous to one another or to the Demanded unit of data, the step of accessing is accomplished with two or more I/O Processes. A first I/O Process fetches the Demanded unit of data and all additional units of data that are physically contiguous with the Demanded unit of data, if any, and a second I/O Process prefetches one or more non-contiguous others of the additional units of data. As a result, the Demanded unit of data is returned to the requestor before the second I/O Process is completed, thus providing an increased efficiency in the operation of the data cache.

BRIEF DESCRIPTION OF THE DRAWING

The above set forth and other features of the invention are made more apparent in the ensuing Detailed Description of the Invention when read in conjunction with the attached Drawing, wherein:

FIG. 4 shows an example of the use of the invention when performing a pure sequential access to a file, the file being illustrated in a logical as opposed to a physical format;

FIG. 5 shows an example of the use of the invention when performing sequential and non-sequential accesses to the file of FIG. 4.

DETAILED DESCRIPTION OF THE INVENTION

Figure 1:
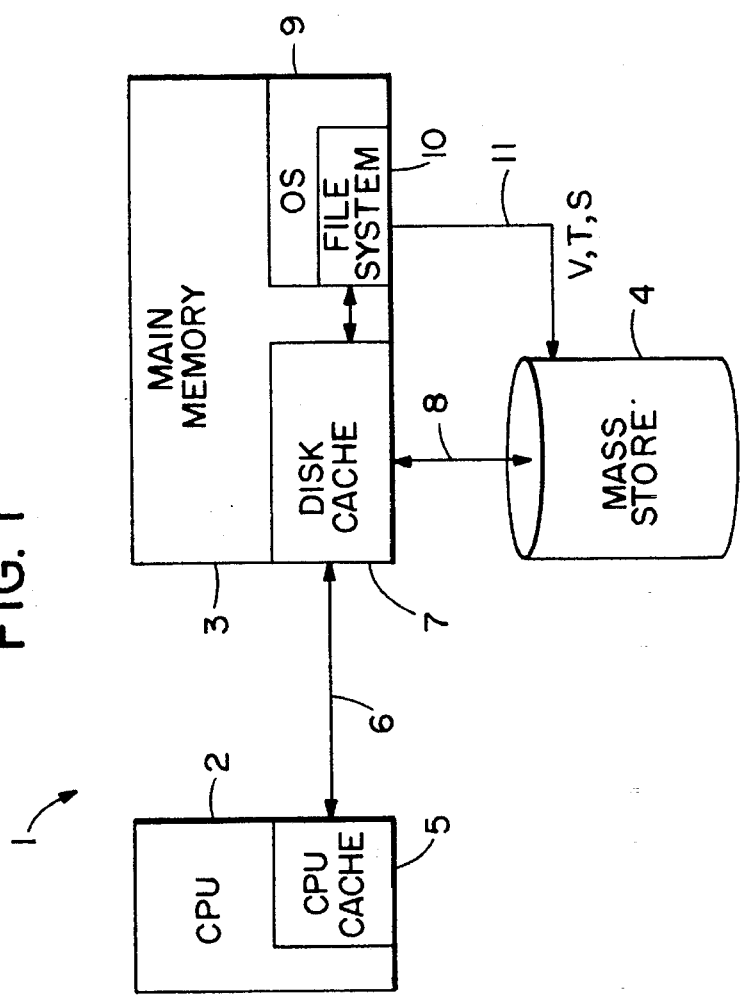
FIG. 1 is a block diagram of a data processing system that includes a disk cache that is operated in accordance with the teaching of the invention.

FIG. 1 illustrates in block diagram form a data processing system 1 that includes at least one Central Processing Unit (CPU) 2, a main memory 3, and a mass storage device, typically embodied in a disk 4. The CPU 2 may include a high speed CPU cache 5 that is bidirectionally coupled via address, data and control signal lines 6 to a further data cache, specifically a disk cache 7 that is included within the main memory 3. The disk cache 7 is bidirectionally coupled via a data path 8 to the disk 4. Resident within the main memory 3 is an Operating System (OS) program 9 that includes a File System 10. During use, the CPU 2 executes the OS program 9, including the File System 10 as required. The File System 10 is coupled, via a suitable device driver (not shown) and signal lines 11, to the disk 4 for issuing I/O Process specifiers to the disk 4. The I/O Process specifiers include location information, such as disk 4 track (T), sector (S), and volume (V) information. In response to the I/O Process specifiers the disk 4 reads information from the specified storage region(s) and provides the read-out data to the disk cache 7 over the data path 8.

In a presently preferred embodiment of the invention the OS program 9 is an operating system known as OS/2 (OS/2 is a Registered Trademark of the International Business Machines Corporation), having a File System that is modified as described in detail below. It should be realized, however, that the teaching of the invention is not limited for use with any one specific type of operating system, or with any one specific type of data processing system architecture. Neither is the teaching of the invention limited for use only with mass storage devices that comprise rotating disks. By example only, the teaching of the invention could also be employed to advantage in a multi-processor data processing system having a magnetic tape data storage system. As such, the ensuing description of the invention is not to be read as applying only to a system of a type depicted in FIG. 1, or in the FIG. 3 to be described next.

Figure 3:
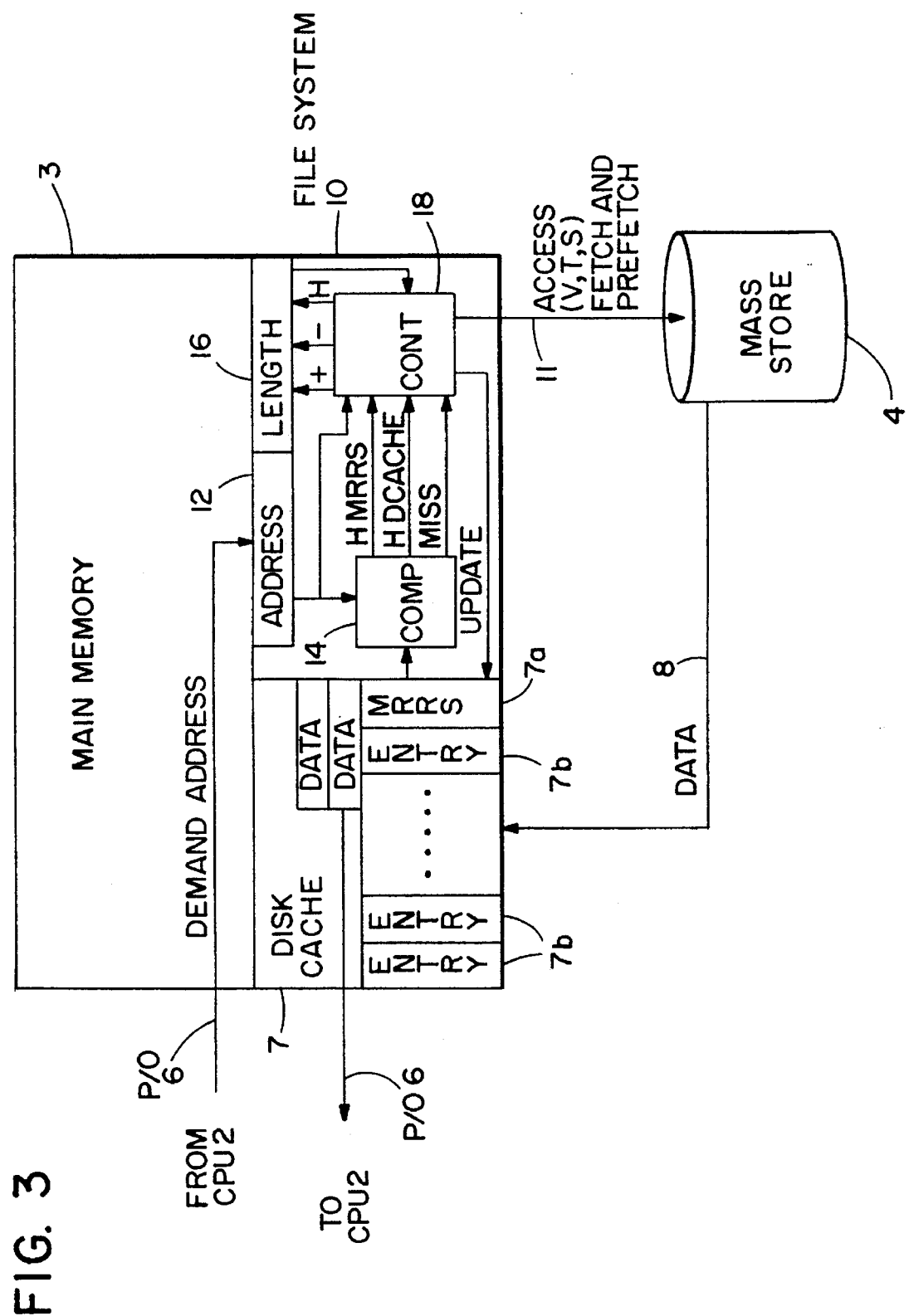
FIG. 3 is a block diagram that illustrates in greater detail the disk cache of the invention and also a file system that operates the disk cache.

In FIG. 3 the main memory 3 can be seen to include the disk cache 7 and the File System 10. The operation of the File System 10 is described in the context of physical devices such as counters and registers. It should be realized, however, that the File System 10 is preferably embodied within a program that is executed by the CPU 2. It should also be realized that it is within the scope of the invention to implement all or some of the functions of the File System 10 with hardware components.

The File System 10 includes an address register 12 for storing a Demand address (DADDR) that is received from the CPU 2. The Demand address specifies an initial address of a page, unit, or block of data that is to be read from a file.

As employed herein, a file is considered to be an identifiable assemblage of data blocks, the data blocks being typically logically related to one another. Each file has an associated file descriptor, the file descriptor providing a summary of information regarding the file, such as the number of bytes in the file, the type of information contained within the file (text, graphics, etc.), file security information, and so forth. In a presently preferred embodiment of the invention the File System 10 includes tables and the like for maintaining the file descriptor information in a manner known in the art. In other embodiments of the invention, such as a distributed file system, the file descriptor information may be maintained and processed differently.

A comparator (COMP) 14 has a first input coupled to an output of the address register 12 and a second input coupled to the disk cache (DCACHE) 7. More specifically, the DCACHE 7 includes a plurality of ENTRIES 7b each of which stores an address or addresses associated with one or more blocks of data that are currently resident within the DCACHE 7. In accordance with an aspect of the invention, one of these ENTRIES is designated as a Most Recently Read-Ahead Section (MRRS) 7a. The comparator 14 compares the address(es) associated with the MRRS 7a, and also the other ENTRIES 7b, to the content of the address register 12. If the content of the address register 12 is found to be stored within one of the ENTRIES 7b or the MRRS 7a, the comparator 14 issues a DCACHE HIT or an MRRS HIT, as appropriate. Otherwise, the comparator 14 issues a DCACHE MISS indication.

The HIT and MISS indications are received by a File System Controller (CONT) 18 which also receives the output from the address register 12. The CONT 18 is coupled to a Prefetch Block Length Counter (LENGTH) 16 by a plurality of signal lines. A first signal line (+) increments the Length Counter 16, a second signal line (−) decrements the Length Counter 16, and a third signal line (H) Holds the Length Counter 16 at a current count. It is noted that the operation of the HOLD signal line may be accomplished instead by not activating either the (+) or the (−) signal lines.

An output of the CONT 18 provides the disk access specifiers 11, such as Volume, Track, and Sector information. In operation, the CONT 18 decodes, in a conventional manner, the DADDR that is stored within the address register 12 to obtain a corresponding location on the disk 4 for a requested unit or block of disk file data. If the requested Demand data is indicated to be stored in the DCACHE 7 (HIT DCACHE or HIT MRRS asserted), the data is returned immediately to the requestor (CPU 2), without requiring a disk access. If the requested Demand data is not stored in the DCACHE 7 (MISS asserted), the CONT 18 initiates an I/O Process to retrieve the Demand data block. The CONT 18 also operates, as is described below in relation to the flowchart of FIG. 6, to possibly prefetch one or more blocks of file data, with a maximum number of prefetched blocks being specified by the content of the Length counter 16.

Figure 6:
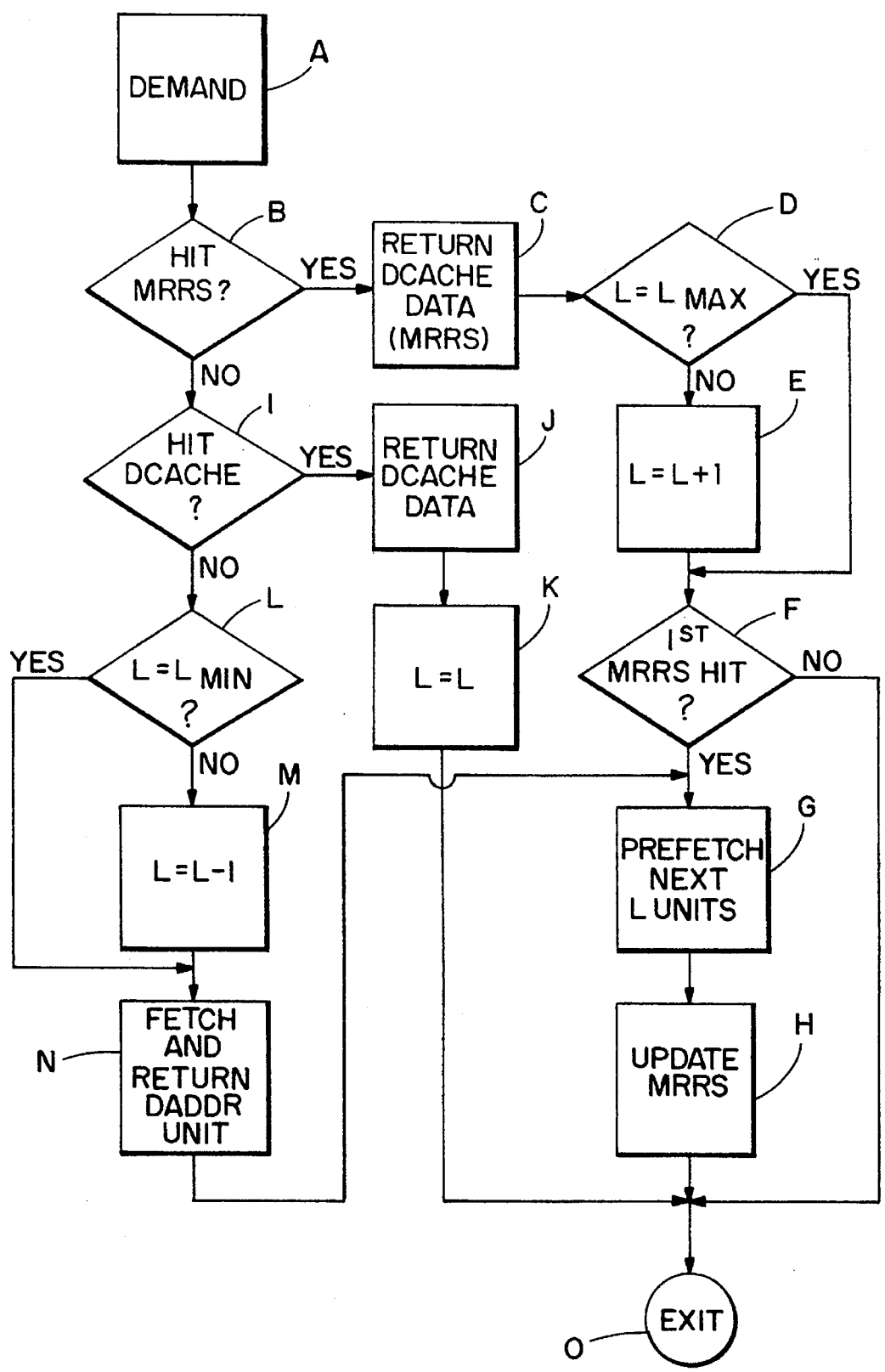
FIG. 6 is a flowchart that illustrates a method of the invention.

Referring now to the flowchart of FIG. 6, at Block A a Demand address (DADDR) is received from the CPU 2. At Block B a determination is made if the DADDR HITs the MRRS 7a. If YES, the corresponding DCACHE 7 data is returned to the requestor (Block C). At Block D a determination is made if the content (L) of the Length Counter 16 is equal to a predetermined maximum count ($L_{MAX}$). If NO, the content (L) of the Length Counter 16 is incremented by 1 (Block E), and control passes to Block F. If YES at Block D, the Length Counter 16 is not incremented, and control passes to Block F.

At Block F a determination is made if the MRRS HIT is the first HIT to the MRRS 7a. If NO, indicating that the MRRS 7a has been HIT at least once before by a previous DADDR, control passes to Block O to EXIT. That is, no prefetching occurs. As a result, only one Prefetch I/O operation occurs for a given MRRS 7a entry. This prevents a potentially large amount of disk data being prefetched in response to multiple Demands for one or more of the data blocks indicated by the MRRS 7a. It is noted, however, that multiple HITs to the MRRS 7a will result in the Length Counter 16 being incremented multiple times, possibly up to the maximum allowed value ($L_{MAX}$). Thus, the value of (L) can be seen to reflect the degree of sequentiality of the incoming Demands. A large value of L indicates a high degree of file data block access sequentiality and, as a result, it is advantageous to prefetch larger numbers of logically contiguous data blocks so as to improve the efficiency of the disk cache 7.

If YES at Block F, indicating that the present DADDR is the first hit of the MRRS 7a, control passes to Block G to prefetch as many as L next units or blocks of the file data, and to store the prefetched data blocks within the plus one ($MRRS_{maxaddr}+1$). At Block H the MRRS 7a is DCACHE 7. An address of the first one of the prefetched data blocks is equal to the highest current MRRS address updated to reflect the addresses of the one or more file data blocks that were prefetched at Block G. The previous MRRS 7a contents then becomes one of the ENTRIES 7b. Control then passes to Block O to EXIT.

If the result of the determination at Block B is NO, control is transferred to Block I where a determination is made if the DADDR HITs one of the DCACHE 7 ENTRIES 7b, but not the MRRS 7a Entry. If YES, it is indicated that the Demanded data block is already resident within the DCACHE 7, but was not the most recently prefetched data block. Control then transfers to Block J where the Demanded data block is returned from the DCACHE 7 to the requestor. At Block K the HOLD signal line is asserted so as to maintain L at the current value (L=L). Alternately, neither the (+) or the (−) signal lines are activated, thereby maintaining the content of the Length Counter 16 at the current value. Control then passes to Block O to EXIT. As a result, for the case where the Demanded data is resident in the DCACHE 7, but was not the most recently prefetched, it is indicated that some sequentiality of file data block accesses is still occurring and, as a result, the current number (L) of prefetched data blocks is not changed.

If the determination at Block I is NO, indicating a DCACHE 7 MISS, a determination is made at Block L if the value of the Length Counter 16 equals a predetermined minimum value ($L_{MIN}$). If NO, L is decremented by one at Block M, and at Block N the demanded data unit is fetched from the disk 4 and returned to the requestor. If YES at Block L, the Block M is not executed and control passes directly to Block N. The operation of Block N is combined with the operation of Block G to perform one or more I/O Processes to also prefetch up to L-next data units.

Figure 2A:
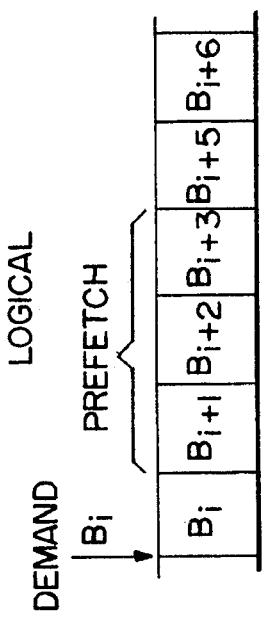
FIGS. 2a, 2b and 2c each show data blocks associated with a file.
Figure 2B:
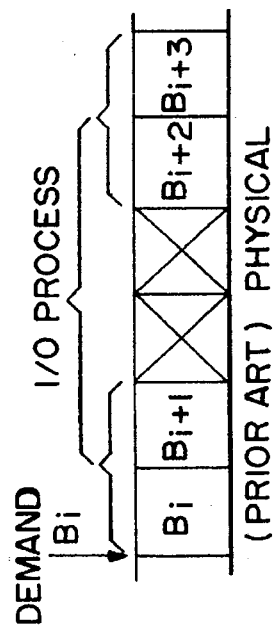

That is, and referring to FIG. 2a for the case where L equals 3, if the next L data blocks ($b_{i+1}$ to $b_{i+3}$) happen to be physically contiguous to one another and to Block$_i$, then one I/O Process is executed to read the Demanded Block ($B_i$) and also the three prefetched blocks. However, if the blocks are not contiguously stored on the disk 4, and in accordance with an aspect of the invention illustrated in FIG. 2c, the CONT 18 performs two I/O Processes, wherein the Demanded block is fetched in conjunction with the physically contiguous prefetched blocks (if any). The Demanded block is stored in the DCACHE 7 and is also returned to the requestor. A second I/O Process is then executed to prefetch the remaining, non-contiguous data blocks $B_{i+2}$ and $b_{i+3}$). As a result, the requestor is not required to wait for the typically longer disk access cycle that is required to retrieve the non-contiguous blocks of file data.

The information specifying the physical locations of the file data blocks is obtained by the CONT 18 from the associated file descriptor information in a manner known in the art.

Figure 2C:
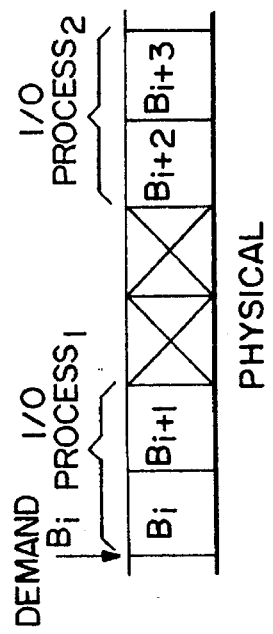

FIG. 4 is an example of the operation of the invention as shown in FIGS. 3 and 6, and illustrates a case of a "purely sequential" file data access wherein the requestor Demands a plurality of logically contiguous data blocks. It should be noted that in FIG. 4, and also in FIG. 5 described below, that the data blocks are shown in a logically consecutive or contiguous manner, with each data block having a block address ($A_n$) associated therewith. In practice, the data blocks may be physically non-consecutive or non-contiguous, as depicted in FIG. 2c. Thus, it should be realized that the prefetching of one or more file data blocks may require the issuance of two or more separate I/O Processes, as described above. Also, in FIGS. 4 and 5 $L_{MIN}$ is assumed to be equal to one, $L_{MAX}$ is assumed to be equal to four, and the increment and decrement values for L are each assumed to be one. In other embodiments of the invention $L_{MIN}$ and $L_{MAX}$ may have other values, and the increment value and decrement value for L may be other than one, may not be predetermined static values, and need not be equal to one another.

Furthermore, in FIGS. 4 and 5 each data unit or block is considered to be of equal size. By example only, if each block has 1000 bytes, then a first block is designated $A_0$(bytes 0000–0999), a second logically consecutive block is designated $A_1$ (bytes 1000–1999), the third logically consecutive block is designated $A_2$ (bytes 2000–2999), etc. As can be seen, for block $A_n$, n may be derived by truncating the three least significant digits of the byte address range within the block.

In FIG. 4 a first Demand ($D_1$) having a DADDR=$A_1$ results in a first file data block being fetched (F) and a first Prefetch (PF1) occurring. PF1 employs an initial value for L, in this case one, to prefetch the file data block beginning at $A_2$. After the F and PF1 I/O Process(es), the file data blocks associated with the F and PF1 are located in the DCACHE 7, and the MRRS 7a is updated to store the address $A_2$.

A second Demand ($D_2$) results in a MRRS HIT indication (FIG. 6, Block B), in that the block $A_2$ was the most recent file data block to be prefetched. The Demanded data block is returned from the DCACHE 7 to the requestor (FIG. 6, Block C) and, in that L=1, L is incremented to 2 (FIG. 6, Blocks E and D). Also, in that this is the first MRRS HIT, a second prefetch (PF2) is performed to retrieve file data blocks $A_3$ and $A_4$ (FIG. 6, Blocks F and G). The previous MRRS entry for $A_2$ is moved to one of ENTRIES 7b, and the MRRS 7a is updated to contain $A_3$ and $A_4$ (FIG. 6, Block H).

A third Demand ($D_3$) results in a MRRS HIT indication (FIG. 6, Block B), in that the block $A_3$ was one of the most recent file data blocks to be prefetched, as indicated by the MRRS 7a. The Demanded data block is returned from the DCACHE 7 to the requestor (FIG. 6, Block C), L is incremented to 3, and, in that this is the first MRRS HIT, a third prefetch (PF3) is performed to retrieve the three file data blocks $A_5$, $A_6$ and $A_7$. The previous MRRS entry for $A_3$ and $A_4$ is moved to one of the ENTRIES 7b, and the MRRS 7a is updated to store $A_5$, $A_6$, and $A_7$. At this point, the DCACHE 7 stores four prefetched data blocks in anticipation of sequential Demands from the requestor.

A fourth Demand (D4) for $A_4$ results in a MRRS MISS indication, but a DCACHE HIT (FIG. 6, Blocks I and J). As a result, the Demanded data block (DADDR=$A_4$) is returned to the requestor from the DCACHE 7 and the value of L is held at three (FIG. 6, Block K).

A fifth Demand ($D_5$) once more results in a MRRS HIT indication (FIG. 6, Block B), in that the block $A_5$ was one of the most recent file data blocks to be prefetched, as indicated by the MRRS 7a. The Demanded data block is returned from the DCACHE 7 to the requestor (FIG. 6, Block C) and L is incremented to 4. In that this is the first MRRS HIT a fourth prefetch (PF4) is performed to retrieve file data blocks $A_8$ through $A_{11}$. The previous MRRS entry for $A_5$–$A_7$ is moved to one of the ENTRIES 7b, and the MRRS 7a is updated to store $A_8$–$A_{11}$. At this point, the DCACHE 7 stores six prefetched data blocks in anticipation of further sequential Demands from the requestor.

The next two Demands ($D_6$ and $D_7$) both MISS the MRRS 7a but HIT one of the DCACHE ENTRIES 7b. As a result, the demanded data blocks are returned to the requestor from the DCACHE 7 and the value of L is held at four.

An eighth Demand ($D_8$) once more results in a MRRS HIT indication (FIG. 6, Block B), in that the block $A_8$ was one of the most recent file data blocks to be prefetched, as indicated by the MRRS 7a. The Demanded data block is returned from the DCACHE 7 to the requestor (FIG. 6, Block C). The comparison at Block D of FIG. 6 indicates that L=$L_{MAX}$, and L is thus held (not incremented or decremented). In that this is the first MRRS HIT, a fifth prefetch (PF5) is performed to retrieve the next four file data blocks $A_{12}$ through $A_{15}$. The previous MRRS entry for $A_8$–$A_{11}$ is moved to one of the ENTRIES 7b, and the MRRS 7a is updated to store $A_{12}$–$A_{15}$. At this point, the DCACHE 7 once again stores six prefetched data blocks in anticipation of more sequential Demands from the requestor.

As can be seen, the operation of the method of the invention provides optimum prefetching for sequential file data block accesses, without prefetching inordinate amounts of disk data.

FIG. 5 depicts the operation of the method of the invention for the reception of logically non-sequential Demands. The response to $D_1$ and $D_2$ is as described above in reference to FIG. 4. The third Demand ($D_3$) can be seen to request the file data block $A_6$. This results in a MRRS and a DCACHE MISS (FIG. 6, Blocks I, L, M, N). At the occurrence of $D_3$, L=2 as described above in reference to FIG. 4. As a result of the MISS, L is decremented to 1, the file data block $A_6$ is Fetched (F), and the file data block $A_7$ is Prefetched (PF3). The previous content of the MRRS 7a is moved to one of the ENTRIES 7b, and the MRRS 7a is updated to store $A_7$.

Demands $D_4$ and $D_5$ both HIT the MRRS, resulting in L being incremented to two and then to three in conjunction with Prefetches PF4 and PF5. Demand $D_6$ MISSes the MRRS 7a but HITs one of the DCACHE ENTRIES 7b, resulting L being held at three.

At the occurrence of the non-sequential Demand $D_7$ the MRRS 7a stores $A_{10}$, $A_{11}$ and $A_{12}$. The DADDR for $D_7$ is equal to $A_{11}$. As a result, the MRRS 7a is HIT (FIG. 6, Blocks B, C, D, E, F, G, and H). This results in L being incremented to four and the PF6 occurring to prefetch the four file data blocks $A_{13}$–$A_{16}$.

If the Demand following $D_6$ is instead the non-sequential Demand $D_6'$ the MRRS 7a is MISSed and one of the DCACHE ENTRIES is HIT. As a result, the file data block A4 is returned to the requestor from DCACHE 7, the value of L is held at 3, and the contents of the MRRS 7a remains unchanged.

If a next Demand after $D_7$ ($D_7'$) has a DADDR =$A_5$, both the MRRS 7a and the DCACHE ENTRIES 7b are MISSed. As a result, the Block $A_5$ is Fetched (F), L is decremented by one, and a PF7 may be executed to prefetch file data blocks $A_6$, $A_7$ and $A_8$.

If it is assumed for this example that $A_6$, $A_7$ and $A_8$ are still resident within the DCACHE 7, as a result of the execution of $D_3$ and $D_4$, then Block G of FIG. 6 is modified to not prefetch the next L blocks. That is, the I/O Process (PF7) is not required. Not performing the prefetch for already-resident data blocks improves the overall efficiency of the DCACHE 7. It should be noted that even though the prefetch may not occur, the MRRS 7a is still updated at Block H of FIG. 6 to indicate data blocks $A_6$–$A_8$.

Furthermore, a condition may arise where, by example, blocks $A_6$ and $A_8$ are resident in the disk cache 7, but block $A_7$ is not. For this case, and in accordance with an aspect of the invention, a first I/O Process is initiated to Fetch and return the Demanded data block $A_5$, and then a second I/O Process is initiated to Prefetch the physically and logically non-contiguous block $A_7$. That is, although the current value of L is 3, due to the MISS resulting from Demand $D_7'$, the CONT 18 is not required to prefetch three blocks. Thus, the value of L represents a maximum number of data blocks that may be prefetched, but does not dictate the actual number of prefetched blocks for every case.

In the foregoing examples it has been assumed that when a Demand occurs, such as $D_6$ in FIG. 4, that the Prefetched data blocks (PF4) are already encached and that the MRRS has been updated. However, this is not always the case. Considering FIG. 4 once more, the Demand 5 ($D_5$) initiates the execution of PF4. In the foregoing description, the receipt of $D_6$ caused a MRRS MISS, but a DCACHE HIT, in that it was assumed that the MRRS had already been updated as a result of the execution of PF4. If, however, $D_6$, and possibly also $D_7$, occurs before the completion of PF4, then the MRRS still contains the information from PF3, i.e., $A_5$, $A_6$ and $A_7$. This condition results in the test at Block F of FIG. 6 indicating NO, and a transfer of control to Block O to EXIT. As a result, for other than the first HIT of the MRRS, another Prefetch operation is not executed or scheduled for execution. As was noted above, the value of L is still incremented regardless of the subsequent outcome of the test at FIG. 6, Block F indicating a first or a subsequent HIT of the MRRS.

It can be appreciated that at some point one or more DCACHE ENTRIES may need to be removed to make room for new file data. This may be accomplished with a well known Least Recently Used (LRU) technique. A presently preferred method for managing the replacement operation of the DCACHE 7 is described in commonly assigned U.S. patent application Ser. No. 07/688,732, filed Apr. 19, 1991, entitled "Hit-Density-Based Replacement for Data Cache With Prefetching".

While the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. A method for operating a data cache that is coupled to a data store, comprising the steps of:

receiving, from a requestor, a Demand for a unit of data, the unit of data being a constituent unit of data of a file comprised of a plurality of logically sequential units of data;

determining from one or more data cache entries if the Demanded unit of data is resident in said data cache; and if the Demanded unit of data is determined to be resident in the data cache, returning the Demanded unit of data from the data cache to the requestor, wherein the step of determining includes the steps of, determining from a predetermined one of the data cache entries if the resident Demanded unit of data is a unit of data that was most recently prefetched into the data cache from the data store during a last-executed prefetch operation, and, if it is determined that the Demanded unit of data was most recently prefetched into the data cache during the last-executed prefetch operation, and if the Demand for the unit of data is the first Demand for a unit of data identified by the predetermined one of the data cache entries, prefetching up to L further units of data from the data store to the data cache, wherein L represents a content of a Prefetch Block Length Counter that is selectively incremented at least when a Demanded unit of data was most recently prefetched into the data cache during the last-executed prefetch operation, otherwise if the Demand for the unit of data is other than the first Demand for a unit of data identified by the predetermined one of the data cache entries, incrementing the Prefetch Block Length Counter without prefetching up to L further units of data from the data store to the data cache.

2. A method as set forth in claim 1 wherein the step of prefetching prefetches up to L further units of data from the data store that are logically contiguous to a last prefetched unit of data.

3. A method as set forth in claim 1 wherein the step of prefetching includes a step of updating the predetermined one of the data cache entries to indicate the identities of the up to L further prefetched units of data.

4. A method for operating a data cache that is coupled to a data store, comprising the steps of:

receiving, from a requestor, a Demand for a unit of data, the unit of data being a constituent unit of data of a file comprised of a plurality of logically sequential units of data;

determining from one or more data cache entries if the Demanded unit of data is resident in said data cache; and if the Demanded unit of data is determined to be resident in the data cache, returning the Demanded unit of data from the data cache to the requestor, wherein the step of determining includes the steps of, determining from a predetermined one of the data cache entries if the resident Demanded unit of data is a unit of data that was most recently prefetched into the data cache from the data store during a last-executed prefetch operation, and, if it is determined that the Demanded unit of data was most recently prefetched into the data cache during the last-executed prefetch operation, prefetching up to L further units of data from the data store to the data cache, wherein L represents a content of a Prefetch Block Length Counter that is selectively incremented at least when a Demanded unit of data was most recently prefetched into the data cache during the last-executed prefetch operation;

wherein the step of prefetching includes the initial steps of, increasing the value of L by an increase increment;

determining if a previously Demanded unit of data was also a unit of data that was most recently prefetched into the data cache from the data store; and, if not, performing the step of prefetching up to L further units of data from the data store to the data cache; otherwise, if a previously Demanded unit of data was also a unit of data that was most recently prefetched into the data cache from the data store, inhibiting the execution of the step of prefetching.

5. A method as set forth in claim 1 wherein, if the step of determining from a predetermined one of the data cache entries if the Demanded unit of data is a unit of data that was most recently prefetched into the data cache from the data store indicates that the resident Demanded unit of data was not most recently prefetched into the data cache, the value of L is not changed before performing the step of prefetching.

6. A method for operating a data cache that is coupled to a data store, comprising the steps of:

receiving, from a requestor, a Demand for a unit of data, the unit of data being a constituent unit of data of a file comprised of a plurality of logically sequential units of data;

determining from one or more data cache entries if the Demanded unit of data is resident in said data cache; and if the Demanded unit of data is determined to be resident in the data cache, returning the Demanded unit of data from the data cache to the requestor, wherein the step of determining includes the steps of, determining from a predetermined one of the data cache entries if the resident Demanded unit of data is a unit of data that was most recently prefetched into the data cache from the data store during a last-executed prefetch operation, and, if it is determined that the Demanded unit of data was most recently prefetched into the data cache during the last-executed prefetch operation, prefetching UP to L further units of data from the data store to the data cache, wherein L represents a content of a Prefetch Block Length Counter that is selectively incremented at least when a Demanded unit of data was most recently prefetched into the data cache during the last-executed prefetch operation;

wherein, if the step of determining from one or more data cache entries if the Demanded unit of data is resident in the data cache indicates that the Demanded unit of data is not resident in the data cache, the method executes instead the steps of:

decreasing the value of L by a decrease increment; and fetching the Demanded unit of data into the data cache while also prefetching up to L further units of data from the data store to the data cache.

7. A method as set forth in claim 6 wherein the step of prefetching prefetches up to L further units of data from the data store that are logically contiguous to the Demanded unit of data.

8. A method as set forth in claim 7 wherein the step of prefetching includes a step of updating a predetermined one of the data cache entries to indicate the identity of the up to L prefetched units of data as being the most recently prefetched units of data.

9. A method as set forth in claim 6 wherein, if the up to L prefetched further units of data are physically contiguous to one another and to the Demanded unit of data, within the data store, the step of fetching and prefetching is accomplished with one I/O Process.

10. A method as set forth in claim 6 wherein, if the up to L prefetched further units of data are not physically contiguous to one another or to the Demanded unit of data, within the data store, the step of fetching and prefetching is accomplished with two or more I/O Processes, wherein a first I/O Process fetches the Demanded unit of data and all of the up to L units of data that are physically contiguous with the Demanded unit of data, if any, and wherein a second I/O Process prefetches one or more non-physically contiguous others of the up to L units of data.

11. A method for operating a data cache that is coupled to a mass storage device, comprising the steps of:

receiving a Demand for a unit of data from a requestor;

determining from one or more data cache entries if the Demanded unit of data is resident in said data cache; and if the Demanded unit of data is determined not be resident in the data cache, accessing the mass storage device to retrieve the Demanded unit of data and up to L additional, logically contiguous units of data, wherein L represents a variable that is selectively incremented at least when a Demanded unit of data was most recently prefetched into the data cache during a last-executed prefetch operation, wherein, if the up to L additional logically contiguous units of data are physically contiguous to one another and to the Demanded unit of data, within the mass storage device, the step of accessing is accomplished with one I/O Process; else if the up to L additional logically contiguous units of data are not physically contiguous to one another or to the Demanded unit of data, the step of accessing is accomplished with at least two I/O Processes, wherein a first I/O Process fetches the Demanded unit of data and all logically contiguous up to L additional units of data that are physically contiguous with the Demanded unit of data, if any, and wherein a second I/O Process prefetches one or more non-physically contiguous others of the up to L additional logically contiguous units of data, wherein the step of determining includes the steps of, determining from a predetermined one of the data cache entries if the resident Demanded unit of data is a unit of data that was most recently prefetched into the data cache from the data store during a last-executed prefetch operation, and, if it is determined that the Demanded unit of data was most recently prefetched into the data cache during the last-executed prefetch operation, and if the Demand for the unit of data is the first Demand for a unit of data identified by the predetermined one of the data cache entries, prefetching up to L further units of data from the data store to the data cache, wherein L represents a content of a Prefetch Block Length Counter that is selectively incremented at least when a Demanded unit of data was most recently prefetched into the data cache during the last-executed prefetch operation, otherwise if the Demand for the unit of data is other than the first Demand for a unit of data identified by the predetermined one of the data cache entries, incrementing the Prefetch Block Length Counter without prefetching up to L further units of data from the data store to the data cache.

12. A method as set forth in claim 11 and including a step of returning the Demanded unit of data to the requestor at a time before the second I/O Process is completed.

13. Apparatus for use in a digital data processor for operating a data cache that is coupled to a data store, comprising:

means for receiving a Demand for a unit of data, the unit of data being a constituent unit of data of a file comprised of a plurality of logically sequential units of data; and means for determining from one or more data cache entries if the Demanded unit of data is resident in said data cache, said determining means being responsive to a condition wherein the Demanded unit of data is determined to be resident in the data cache for returning the Demanded unit of data from the data cache, said determining means further comprising means for ascertaining from a predetermined one of the data cache entries if the Demanded unit of data is a unit of data that was most recently prefetched into the data cache from the data store during a last-executed prefetch operation, and, if so, for prefetching up to L further units of data from the data store to the data cache, wherein L represents a variable that is selectively incremented at least when a Demanded unit of data was most recently prefetched into the data cache during the last-executed prefetch operation, said apparatus further comprising means for updating the predetermined one of the data cache entries to indicate the identities of the L prefetched further units of data, wherein said means for ascertaining is further responsive to a condition wherein the Demand for the unit of data is other than the first Demand for a unit of data identified by the predetermined one of the data cache entries, for incrementing the variable L without prefetching further units of data from the data store to the data cache.

14. Apparatus as set forth in claim 13 wherein said means for ascertaining and prefetching is responsive to a condition wherein further units of data are not physically contiguous to one another or to the Demanded unit of data, within the data store, for prefetching the L further units of data with two or more I/O Processes, wherein a first I/O Process fetches at least the Demanded unit of data and all of the up to L units of data that are physically contiguous with the Demanded unit of data, if any, and wherein a second I/O Process prefetches one or more non-physically contiguous others of the up to L units of data.

* * * * *